July 2, 1963 L. A. ARSANDAUX 3,095,917
VEHICLE TIRE
Filed Oct. 17, 1961 2 Sheets-Sheet 1

United States Patent Office 3,095,917
Patented July 2, 1963

3,095,917
VEHICLE TIRE
Louis Adrien Arsandaux, Paris, France, assignor to Pneumatiques et Caoutchouc Manufacture Kleber-Colombes, Paris, France, a corporation of France
Filed Oct. 17, 1961, Ser. No. 145,667
Claims priority, application France Oct. 19, 1960
14 Claims. (Cl. 152—155)

This invention relates to vehicle tires of the inflatable type and to a member insertable therein for sustaining the tire even though the tire carcass is punctured.

Military vehicles used in combat zones must retain their ability to move rapidly even after being struck by bullets, shell splinters and other objects. Therefore, although conventional pneumatic tires provide the advantage of greater speed and mobility than crawler track running gear for combat vehicles, the vulnerability of conventional pneumatic tires to puncture, with consequent immobility of the vehicle, is a serious drawback to use of such tires in combat zones. There is, therefore, a very pressing need for vehicle tires which can remain operational even though punctured by bullets, shell fragments, or other objects.

Vehicles employed for transport of personnel or materials in other than combat areas are also subject to puncturing during operation which, through release of the inflation air, temporarily immobilizes the vehicle. This is a matter of serious concern not only to military personnel but also to civilians because, in addition to delays, there are very real hazards to life and property occasioned by deflation of pneumatic tires especially when this occurs at high speed.

Attempts have been made for many years to reduce the risks resulting from puncturing and deflation of vehicle tires both for civilian and military use. These prior attempts have taken a variety of forms including liners placed within the tire to prevent penetration of perforating objects, diaphragms providing an auxiliary air chamber to prevent complete collapse of the tire if the main air chamber is punctured, and partial or complete filling of the carcass with cellular material such as sponge rubber or the like. None of these prior attempts have had unqualified success.

The provision of perforation resisting layers in tires has, of necessity, been restricted to the tread regions because of the need to preserve flexibility of the sidewalls. Such layers or liners, therefore, provide no protection against perforation of the sidewalls and, when this occurs, the tire no longer provides any support and completely collapses. The provision of diaphragms forming auxiliary air chambers likewise provides no protection against objects penetrating through the sides of the tire and, in the case of objects penetrating through the tread, provides no protection when these objects are of length greater than the distance to the interior of the diaphragm or, although shorter, enter at high velocity as, for example, bullets or shell fragments. Here, again, loss of air pressure from the auxiliary chamber results in complete collapse of the tire. The provision of sponge rubber or other filling materials occupying the entire or major portion of the interior of the carcass results in stiffness of the tire which causes excessive heat build up at high speeds as well as severely limiting the types of terrain over which the tire is operable. Cellular liners of fillings for tires supplemented by inflatable tubes do not provide sufficient support when air pressure within the tire is lost.

The reasons for failure of the prior proposals for permitting continued operation of inflatable tires when punctured, can be understood from a consideration of the nature of a pneumatic tire and the functioning thereof.

In this regard, it should be noted that the reactions of an inflated tire depends primarily upon the state of the stresses imposed upon all elements of the tire carcass, the function of the inflation pressure being maintenance of the carcass elements under tension. When an inflated vehicle tire is at rest, with no load applied thereon, the internal stresses are due only to the inflation pressure and these are symmetrically distributed about the tire. However, when the tire is under load and/or partaking of forces resulting from rotation and encountering irregularities of the surface traversed, the carcass of the tire is deformed thereby causing a modification in the stresses in different portions of the carcass so that these are no longer symmetrical but are balanced, so long as the tire remains inflated, by distribution of the stresses with this distribution being effected, at least in part, by the inflation fluid. The essential disadvantage of employing only an inflation fluid within a tire carcass to effect the tensioning thereof and assist in the distribution of the forces acting thereon resides in the obvious fact that loss of the inflation pressure, by puncturing or other defect, releases the stress distributing medium so that the carcass is no longer able to sustain its shape or elastic support of the load which is placed thereon through the vehicle.

Prior attempts to replace in whole or part the air or other inflation fluid by non-compressible solid material or by compressible solid material, such as sponge rubber or the like, have, as noted above, either resulted in excessive stiffness of the tire so that it is essentially a solid tire or have not provided the required stress distribution. In either case, the tire is less satisfactory for vehicle operation than a conventional inflatable tire.

In accordance with this invention, the above-mentioned defects of prior attempts to prevent collapse of a punctured vehicle tire are overcome by at least partially replacing the inflation pressure by an elastic, incompressible, non-inflatable means which stresses the carcass of the tire in a manner similar to fluid under pressure but independently thereof. This results in tire performance comparable to that of a conventional inflatable tire as well as having properties not possessed by the latter.

The said means is in the form of a liner or filler comprising a mass of homogeneous incompressible elastomer which is in continuous contact with substantially the entire inner surface of the carcass and is so constructed that, when placed therein and the tire is mounted upon a wheel, the carcass of the tire is placed under tension due to the elastic reaction of the liner or filler. The homogeneity and non-compressibility of the liner or filler results in less heating of the tire and liner than occurred with prior tire inserts when the tire is subjected to the usual cyclic flexing during operation.

The filler or linear member may be employed either in a conventional tire carcass or in one which is made in a special shape and the filler may be either adhered to the inner surface of the carcass or not, as desired. In either case, the filler or linear mass is preferably a rubber, either natural or synthetic, which has a low hysteresis and a hardness lower than 25 as measured by a type A Shore Durometer with the preferred hardness being approximately 10. The specific gravity of the liner or filler is between 0.8 and 1.2 and it is of a size such that the volume thereof is approximately 40 to 80% of the interior volume of the tire carcass in which it is placed. The volume of the tire carcass interior not occupied by the liner or filler is in the form of an annular air chamber either at atmospheric pressure or at elevated pressure. Fluid pressure above atmospheric, when utilized, is provided by an inflation tube which is so located within the tire and its filler has to be substantially immune from penetration by bullets, shell splinters, and other objects. Moreover, the action of the inflation fluid, when used, in prestressing the carcass is additive to that imposed by the filler so that the fluid pressure may be employed to provide for a range of prestressing of the carcass through selection of the inflation pressure.

In the accompanying drawings, forming a part of this application, which illustrate embodiments of the invention:

Figure 1:
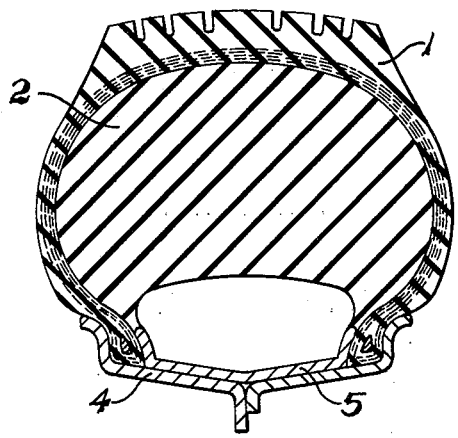
FIG. 1 is a transverse section through a rim-mounted vehicle tire and liner or filler mass of the invention as it is employed in the presently preferred embodiment.
Figure 2:
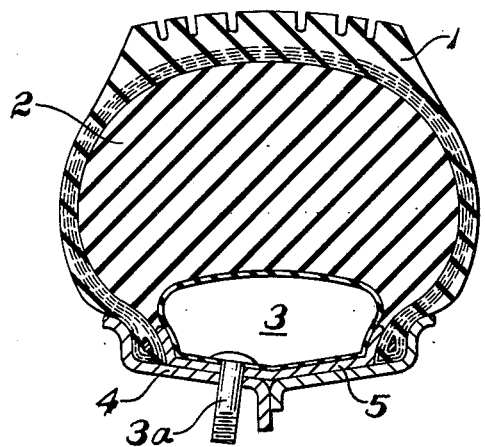
FIG. 2 is a view similar to FIG. 1 showing the addition of a tube for containing fluid under pressure.
Figure 3:
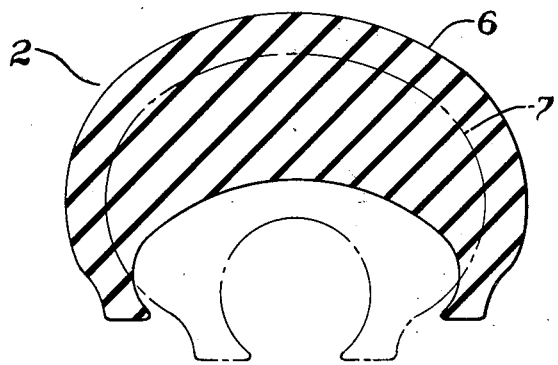
Figure 4:
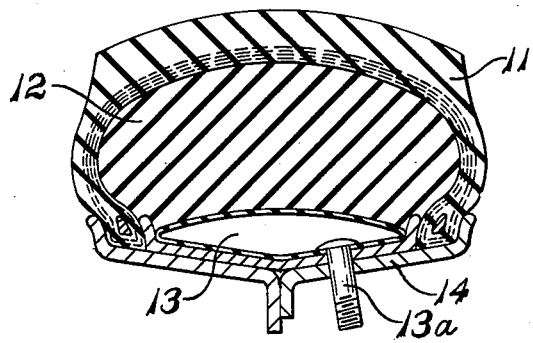
Figure 5:
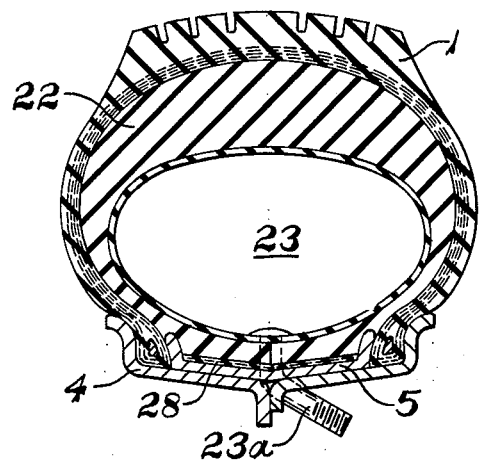
Figure 6:
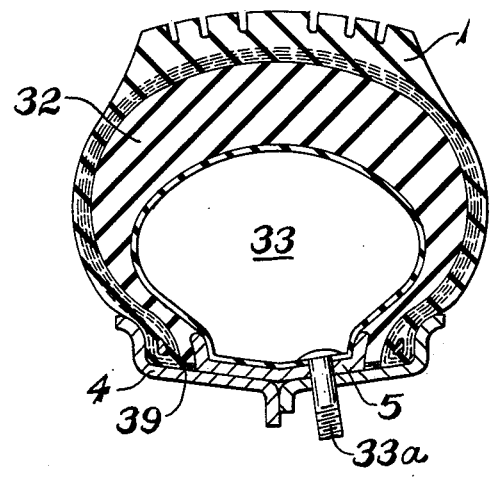

FIG. 3 shows, in solid lines, a transverse section through the presently preferred embodiment of the liner or filler mass for a tire of the type shown in FIGS. 1 and 2 when the filler mass or liner is in its free or undistorted shape while the broken lines in the figure show the configuration of the liner or filler mass when it is incorporated within a rim-mounted vehicle tire of the type shown in FIGS. 1 and 2; and FIGS. 4, 5 and 6 are, respectively, transverse sections through other embodiments of rim-mounted tires provided with liners or fillers in accordance with the invention.

The invention is illustrated in FIG. 1 as it is incorporated in a conventional inflatable type tire 1 of generally toroidal shape comprising the usual hollow carcass of cord-reinforced elastomer terminating in spaced beads and surmounted by a running surface or tread. The novel liner or filler mass 2 is placed within the tire carcass before it is mounted upon the wheel rim. In the illustrated embodiment, the rim 4 is shown as circumferentially divided, being formed of two pressed steel sections which are brought together and secured by bolts not shown. Extending between the adjacent inner sides of the tire beads is an annular steel bracer 5 which maintains the tire beads against the rim flanges at all times even though the bead reinforcements should be broken. In the embodiments shown in FIGS. 1 and 2, the liner or filler mass 2 has an annular recess adjacent the rim upon which the tire is mounted. This may be occupied by air under atmospheric pressure, as in FIG. 1, or this region may be occupied, as shown in FIG. 2, by an inflatable tube 3 provided with a valve 3a for the admission of fluid under pressure.

The liner or filler mass 2 is formed entirely of a homogeneous mass of vulcanized incompressible elastomer, preferably either natural or synthetic rubber, which has a low hysteresis and a hardness lower than 25 as measured by a type A Shore Durometer, the preferred hardness being approximately 10 as so measured.

The liner or filler mass 2 is initially formed to a configuration which is generally U-shape in cross section with the bight thereof disposed radially outwardly and with the outer peripheral dimensions thereof greater than the dimensions of the interior of the tire in which it is adapted to be placed. Thus, for a tire of the configuration shown in FIGS. 1 and 2, the non-deformed outline of the cross section of the liner or filler mass 2 is as shown by the solid lines 6 in FIG. 3. When the liner or filler mass 2 is placed in the tire carcass and the latter is mounted as shown in FIGS. 1 and 2, the liner is deformed to the configuration of the interior of the tire carcass and assumes a shape as indicated by broken lines 7 in FIG. 3. It will be readily apparent, therefore, that this distortion, which is maintained by the tire carcass and the mounting thereof upon the rim, causes the liner or filler 2 to exert radially outwardly acting forces throughout the entire interior of the tire carcass stressing the latter in a manner similar to the action of an inflation fluid under predetermined pressure. Hence the tire with the liner or filler has static characteristics comparable to those of a conventional pneumatic tire.

A tire and liner combination, as just described, has been found under test upon vehicles of the "Jeep" type to have a load distortion curve practically identical with that of a tire of the same construction when inflated with air at a pressure in the range recommended for tires of this size and the loads normally carried thereby. Under higher than normal loads, the load curve of the tire embodying the novel liner or filler undergoes less flattening than an air inflated tire and this has the advantage of avoiding excessive distortion stresses in the case of overload of the vehicle.

As noted above, the radially inner region of the liner is so shaped as to provide a small annular chamber which may contain air at atmospheric pressure or may be provided with an inflation tube into which air under pressure may be introduced. In the latter case, the pressure of the inflation air is additive to the action of the liner or filler and the stresses created in the tire by this combined action are fully equivalent to the action of inflation air alone.

The rotation of a tire provided with the novel liner or filler subjects the latter to centrifugal acceleration which introduces an additional range of tensions in the tire that are of dynamic origin and are superimposed upon the tensions created by the distortion of the liner and/or pressure of inflation fluid, if the latter be used. The tensions produced by centrifugal acceleration of the the mass 2 increase in intensity proportional to the square of the speed of rotation so that the effective pressure of the tire increases thus diminishing its flexing and reducing the undesired heat buildup which results from flexing of conventional tires at high speeds.

A tire with a liner or filler mass, provided in accordance with this invention, is substantially invulnerable and may be perforated by bullets, shell fragments, or other objects without loss of vehicle supporting action. Thus, a tire in which the filler 2 occupies about 75% of the total volume with the remainder formed by an air chamber, has that air chamber so located that it is substantially inaccessible to penetrated objects. Hence, puncturing of the cracass and even of the filler mass may be quite extensive without any loss of rigidity of the tire and certainly with so little change therein that its mobility is not impaired. For example, it has been found in test runs of tires equipped with liners or fillers as just described that puncturing with bullets or other objects did not result in any loss of mobility and the tires could continue to run after such puncturing without any deterioration of the tire. Even in the event the supplementary air chamber contains fluid under pressure and this is perforated, operation of the vehicle equipped with such tires can safely continue without injury of the tire carcass. However, the risk of such penetration is extremely small since the air chamber is of a size and so located that it is protected in a large measure by the flanges of the wheel rim.

The vulnerability of a tire incorporating this invention can be further lessened by giving the tire a more flattened shape than that shown in FIGS. 1 and 2. Thus, as indicated in FIG. 4, the tire 11, which is of conventional cord-reinforced elastomer construction, has a configuration which, although generally toroidal, is of the so-called low profile type since its cross-sectional height is less than its width. Such a tire is mounted upon a rim 14 of larger diameter and greater width than the rim 5 shown in FIGS. 1 and 2. This tire is provided with a liner or filler mass 12 of the same nature as that described for the mass 2 but made in a shape of proper configuration to contact substantially the entire interior surface of the carcass and exert tensioning stresses thereon in the same manner as the liner or filler 2 operates in the tires shown in FIGS. 1 and 2. This is achieved by initially forming the filler mass or liner 12 to a configuration of greater outer peripheral dimensions than that of the interior of the tire so that the liner or filler is distorted or deformed when placed in the tire and mounted as shown in FIG. 4.

The tire of FIG. 4, like that illustrated in FIG. 2, has the liner or filler 12 provided with an annular recess in which is located a small inflation tube 13 to which inflation fluid may be introduced by valve 13a. In this case, the inflation chamber, provided by the tube 13, is generally elliptical and of small height, the radially outer dimension of which is approximately the same as the outer diameters of the flanges on the rim 14. Hence, the inflation chamber is protected from any laterally directed perforating object and can only be reached by objects entering through the tread or the upper sidewalls at an appreciable angle with the result that there is very little likelihood of penetration of the air chamber. Even in the remote possibility of such penetration, the loss of fluid pressure from the chamber or tube 13 does not result in such decrease of stiffness of the tire as to cause collapse thereof and hence the vehicle may continue to safely operate without substantial reduction in speed. The particular shape of the section of the tire and filler mass shown in FIG. 4 has the further advantage of permitting a reduction in weight of the liner or filler and a better degree of roadability in case of puncture or perforation of the chamber 13 than is the case of a tire having the shape shown in FIG. 1.

FIGS. 5 and 6 show other embodiments of the invention which are well adapted for use as safety tires for civilian vehicles. In these embodiments, the puncturing of the air chamber at high speed does not entail the usual dangers to operation of the vehicle which occur when conventional air-inflated tires are employed and are punctured. Thus, in a tire with a liner or filler of this invention, the vertical rigidity of the tire comes in part from the combined action of the filler mass or liner, which occupies from 40 to 60% of the volume of the carcass and which has been prestressed upon insertion in the tire and mounting of the latter upon a rim. Part of the vertical rigidity of the combination during running is also provided by the centrifugal acceleration of the mass of the liner as has been previously explained. The remainder of the stressing of the carcass or rigidity thereof is, of course, provided by the inflation fluid. The stressing of the carcass by the centrifugal force acting on the liner or filler obviously is increased with speed and is independent of the pressure of air in the air chamber. By way of specific example, a modern touring type vehicle tire which has an inflation pressure in the order of 1.5 kilograms per square centimeter will, when provided with a liner or filler mass according to this invention and travelling at 100 kilometers per hour, have the carcass stressed by the combination of the action of the liner and the inflation pressure equivalent to that produced by an inflation pressure of 2.5 to 3.5 kilograms per square centimeter when the tire is at rest. Hence, if the air chamber of the novel tire and liner construction of this invention is punctured at speeds of 100 kilometers per hour, the tire carcass would still be stressed equivalent to an inflation pressure of 1 to 2 kilograms per square centimer. Flat rolling of the tire, therefore, does not occur immediately upon puncture and will occur, if at all, only at speeds which are sufficiently low so that the danger of throwing the car out of control is avoided.

Referring to FIG. 5, a tire suitable for a passenger vehicle containing a liner or filler mass, in accordance with this invention, comprises the tire 1 of conventional construction similar to that shown in FIGS. 1 and 2 but with the liner or filler mass 22 shaped to provide a larger air chamber 23 than in the case of the tire and fillers of FIGS. 1 and 2. This filler 22 has a relatively large base which is split along its central circumferential plane to facilitate the introduction of the filler into the tire. The two adjacent edges or lips of the base of the filler are firmly joined after introduction of the filler into the tire carcass by means of an unstretchable band 28 which may be formed of cord-reinforced elastomer or other flexible, non-stretchable material adhered to the base of the filler. This band or layer 28 also serves to keep the base portion of the filler in contact with the metal bracing member 5 in spite of the centrifugal acceleration upon the filler. The air chamber of the filler is peferably provided with an inflatable tube 23 which has a conventional valve 23a for the introduction of fluid under pressure.

In the embodiment of the invention shown in FIG. 6, the filler or liner 32 does not have a base portion extending over the rim as in FIG. 5 but rather has two spaced cheeks or sides the inner edges of which are suitably reinforced by inextensible bands or layers 39 adhered to them. These bands 39 may be formed of cord-reinforced elastomer or other flexible, non-stretchable material. The reinforced cheeks or sides of the liner are inserted between the beads of the tire carcass and the bracer member 5, and the interior of the liner or filler receives an inflatable tube 33 provided with a valve 33a for the introduction of fluid under pressure.

The liner or filler 32 is, like the fillers of the previous embodiments, initially shaped to a configuration of greater outer peripheral dimensions than the dimensions of the interior of the tire in which it is placed so that, when the filler is inserted in the tire and the latter is mounted on the rim, the carcass is placed under tensioning stresses. Although this liner or filler is of lesser cross section than those illustrated in FIGS. 1–4, it is, nevertheless, sufficient to prevent complete collapse of the tire when punctured while operating at high speeds with the result that the vehicle may be safely brought to a stop without loss of control. Moreover, the thickness of the filler or liner is sufficient that it provides a very efficacious obstruction to the penetration of puncturing objects, it being remembered that the liner is deformed by compressive forces and, hence, is not as readily penetrated by puncturing objects as is the carcass of the tire itself which is under tension.

The dimensions and cross-sectional configuration of the liner or filler, formed in accordance with this invention, will, of course, be selected in accordance with the size and nature of the tire carcass in which it is to be employed and to provide therein the desired configuration of the radially inwardly annular air chamber or compartment. The liner or filler shape and dimensions in each case, however, are such that the liner or filler is so deformed when mounting it in a tire carcass as to insure contact with the entire interior of the crown and sidewalls of the tire and the exertion of tensioning forces thereon. The volume of the liner or filler is such that it occupies 40 to 80% of the volume of the interior of the tire carcass with the remainder of the tire volume occupied by air which may be either under atmospheric or elevated pressure depending upon the surface for which the tire is intended. Hence, while the invention has been described with reference to the specific features thereof as they are incorporated in a preferred embodiment and the several disclosed modifications, it will be apparent that changes in dimensions and details of construction can be made without departing from the principles of the invention. Hence, the drawings and description are understood as illustrative only of the invention, the scope of which is determined by the appended claims.

Having thus described the invention, I claim:

1. An annular member for insertion into the carcass of a conventional vehicle tire of the inflatable type to at least partially support the latter when punctured, the said member having a volume of 40–80% of the volume of the interior of the tire carcass in which the member is adapted to be placed and being formed throughout of incompressible elastomer having a hardness less than 25 as measured on a type A Shore Durometer, the said member having a configuration in cross section which is generally U-shape with the bight thereof disposed radially outwardly and with the outer peripheral dimensions of the free shape of said member being greater than the interior dimensions of the tire in which it is adapted to be placed, the lateral extent of the member being sufficient to contact the entire interior of the crown and sidewalls of the tire when inserted therein to thereby exert tensioning stresses therein.

2. An annular member as defined in claim 1 wherein the elastomeric material has a hardness of approximately 10 as measured on a type A Shore Durometer.

3. An annular member as defined in claim 1 having a single hollow generally annular chamber interiorly thereof.

4. An annular member as defined in claim 3 having its radially inner portions so shaped and of such dimensions that they contact each other when placed in a tire thereby enclosing the said chamber.

5. A vehicle tire of the inflatable type comprising a hollow carcass of cord-reinforced elastomer open at its radially inner portion with a running surface opposite said open portion and an annular member formed throughout of homogeneous incompressible elastomer in said carcass in contact with the interior surface of the latter, the said member occupying 40 to 80% of the volume of the interior of the carcass and having a free shape of greater outer peripheral dimensions than the dimensions of the interior of the tire carcass so that when said member is inserted in the carcass it is deformed by said carcass in a manner causing the member to exert tension stresses in the carcass similar to those created therein by inflation with fluid under pressure.

6. A vehicle tire as defined in claim 5 wherein the elastomer of said member has a hardness less than 25 as measured by a type A Shore Durometer.

7. A vehicle tire as defined in claim 5 wherein the elastomer of said member has a hardness of approximately 10 as measured by a type A Shore Durometer.

8. A vehicle tire as defined in claim 5 wherein the said member has a single interior annular chamber.

9. A vehicle tire as defined in claim 5 wherein the said annular member has a hollow interior chamber and further comprising an inflatable tube in said hollow chamber provided with a valve extending externally of the tire for introduction of fluid under pressure.

10. A vehicle tire of the inflatable type comprising a hollow carcass of cord-reinforced elastomer open at its radially inner portion and provided with spaced beads adapted to be mounted on a wheel rim, and an annular member formed throughout of homogeneous incompressible elastomer within said carcass extending substantially from bead to bead thereof over the entire interior of the carcass sidewalls and crown in continuous contact therewith, said member occupying 40 to 80% of the volume of the interior of the carcass and having a free shape of greater outer peripheral dimensions than the dimensions of the interior of the tire so that the member is deformed when in contact with said carcass in a manner causing the member to exert tension stresses on the carcass similar to those created therein by inflation with a fluid under pressure.

11. A vehicle tire as defined in claim 10, wherein the portions of said member adjacent the beads of the carcass extend into contact with each other when the member is mounted in the tire, the said member having a recess interiorly thereof providing a closed annular chamber when the member is mounted in the tire carcass.

12. A vehicle tire of the inflatable type comprising a hollow carcass of cord-reinforced elastomer open at its radially inner portion and provided with spaced beads adapted to be mounted on a wheel rim having radially outwardly extending flanges, said tire having a bead-to-bead width greater than its cross-sectional height and containing an annular member formed throughout of homogeneous incompressible elastomer in contact with the entire inner surface of the sidewalls and crown of the carcass and occupying the majority of the volume thereof, said member having a free shape of greater outer peripheral dimensions than the interior dimensions of the carcass so that the deformation of the member when in the carcass causes the exertion of tension stresses in the latter similar to those created by inflation with fluid under pressure.

13. A vehicle tire as defined in claim 12 wherein the radial inner surface of said member has a recess the radially outer extent of which is approximately the same as the radial extent of said rim flanges, and a tube of elastomeric material contained within said recess and provided with a valve for the introduction therein of fluid under pressure.

14. A vehicle tire of the inflatable type comprising a hollow carcass of cord-reinforced elastomer open at its radially inner portion and provided with an annular member formed throughout of incompressible homogeneous elastomer having a hardness less than 25 as measured on a type A Shore Durometer and a specific gravity in the range of 0.8 to 1.2, the said member having an undeformed configuration which is generally U-shape in cross section with the bight thereof disposed radially outwardly and with the undeformed outer peripheral dimensions greater than the interior dimensions of said carcass, said member occupying 40–80% of the interior volume of said carcass and being deformed in said tire into contact with the entire interior of the crown and sidewalls of the latter to thereby exert stresses therein equivalent to those created by inflation of the tire by fluid under pressure.

References Cited in the file of this patent

UNITED STATES PATENTS

| | | |
|---|---|---|
| 754,648 | Fiske | Mar. 15, 1904 |
| 1,306,724 | Schyllander | June 17, 1919 |
| 1,330,756 | Brown | Feb. 10, 1920 |
| 1,585,875 | Price | May 25, 1926 |
| 2,708,469 | Lydon | May 13, 1955 |
| 2,939,502 | Hindin et al. | June 7, 1960 |

FOREIGN PATENTS

| | | |
|---|---|---|
| 1,039,645 | France | May 20, 1953 |